US010542126B2

(12) United States Patent
Nayak (10) Patent No.: US 10,542,126 B2
(45) Date of Patent: Jan. 21, 2020

(54) OFFLINE VIRTUAL PARTICIPATION IN AN ONLINE CONFERENCE MEETING

(71) Applicant: Cisco Technology, Inc., San Jose, CA (US)

(72) Inventor: Panchanan Nayak, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 26 days.

(21) Appl. No.: 14/579,281

(22) Filed: Dec. 22, 2014

(65) Prior Publication Data

US 2016/0182580 A1   Jun. 23, 2016

(51) Int. Cl.
H04L 29/06   (2006.01)

(52) U.S. Cl.
CPC ..................... *H04L 69/28* (2013.01)

(58) Field of Classification Search
CPC ............ H04L 12/1831; H04L 12/1827; H04L 65/403; H04L 65/1089; H04L 65/4038; H04L 65/4023; H04L 65/1093; H04L 12/1822; H04L 69/28; H04M 3/565; H04M 2203/5081; H04M 3/533; H04M 3/56; H04M 2203/5054; H04M 3/42059; H04M 2203/301; H04N 7/15
See application file for complete search history.

(56) References Cited

U.S. PATENT DOCUMENTS

| | | | |
|---|---|---|---|
| 4,460,807 A | 7/1984 | Kerr et al. | |
| 4,890,257 A | 12/1989 | Anthias et al. | |
| 4,977,605 A | 12/1990 | Fardeau et al. | |
| 5,293,430 A | 3/1994 | Shiau et al. | |
| 5,694,563 A | 12/1997 | Belfiore et al. | |
| 5,699,082 A | 12/1997 | Marks et al. | |
| 5,745,711 A | 4/1998 | Kitahara et al. | |
| 5,767,897 A | 6/1998 | Howell | |
| 5,825,858 A | 10/1998 | Shaffer et al. | |

(Continued)

FOREIGN PATENT DOCUMENTS

| | | |
|---|---|---|
| CN | 101055561 | 10/2007 |
| CN | 101076060 | 11/2007 |

(Continued)

OTHER PUBLICATIONS

Cisco White Paper, "Web Conferencing: Unleash the Power of Secure, Real-Time Collaboration," pp. 1-8, 2014.

(Continued)

*Primary Examiner* — Vivek Srivastava
*Assistant Examiner* — Muhammad Raza
(74) *Attorney, Agent, or Firm* — Polsinelli PC (57) ABSTRACT

Systems, methods, and non-transitory computer-readable storage media for allowing an invitee to record a presentation prior to an online conference meeting. For example, invitations to an upcoming meeting hosted on an online conferencing system can be sent by a conference server. The invitation can have a meeting time associated with the meeting. The conference server can receive a request by an invitee of the upcoming meeting. The request can be to access the upcoming meeting prior to the meeting time. In response to the request, the invitee can record a presentation for the upcoming meeting. During the online conference, the recorded presentation can be played.

15 Claims, 6 Drawing Sheets

(56) References Cited

U.S. PATENT DOCUMENTS

| | | |
|---|---|---|
| 5,874,962 A | 2/1999 | de Judicibus et al. |
| 5,889,671 A | 3/1999 | Autermann et al. |
| 5,917,537 A | 6/1999 | Lightfoot et al. |
| 5,995,096 A | 11/1999 | Kitahara et al. |
| 6,023,606 A | 2/2000 | Monte et al. |
| 6,040,817 A | 3/2000 | Sumikawa |
| 6,075,531 A | 6/2000 | DeStefano |
| 6,085,166 A | 7/2000 | Beckhardt et al. |
| 6,191,807 B1 | 2/2001 | Hamada et al. |
| 6,300,951 B1 | 10/2001 | Filetto et al. |
| 6,392,674 B1 | 5/2002 | Hiraki et al. |
| 6,424,370 B1 | 7/2002 | Courtney |
| 6,463,473 B1 | 10/2002 | Gubbi |
| 6,553,363 B1 | 4/2003 | Hoffman |
| 6,554,433 B1 | 4/2003 | Holler |
| 6,573,913 B1 | 6/2003 | Butler et al. |
| 6,646,997 B1 | 11/2003 | Baxley et al. |
| 6,665,396 B1 | 12/2003 | Khouri et al. |
| 6,700,979 B1 | 3/2004 | Washiya |
| 6,711,419 B1 | 3/2004 | Mori |
| 6,754,321 B1 | 6/2004 | Innes et al. |
| 6,754,335 B1 | 6/2004 | Shaffer et al. |
| RE38,609 E | 10/2004 | Chen et al. |
| 6,816,464 B1 | 11/2004 | Scott et al. |
| 6,865,264 B2 | 3/2005 | Berstis |
| 6,938,208 B2 | 8/2005 | Reichardt |
| 6,978,499 B2 | 12/2005 | Gallant et al. |
| 7,046,134 B2 | 5/2006 | Hansen |
| 7,046,794 B2 | 5/2006 | Piket et al. |
| 7,058,164 B1 | 6/2006 | Chan et al. |
| 7,058,710 B2 | 6/2006 | McCall et al. |
| 7,062,532 B1 | 6/2006 | Sweat et al. |
| 7,085,367 B1 | 8/2006 | Lang |
| 7,124,164 B1 | 10/2006 | Chemtob |
| 7,149,499 B1 | 12/2006 | Oran et al. |
| 7,180,993 B2 | 2/2007 | Hamilton |
| 7,209,475 B1 | 4/2007 | Shaffer et al. |
| 7,340,151 B2 | 3/2008 | Taylor et al. |
| 7,366,310 B2 | 4/2008 | Stinson et al. |
| 7,418,664 B2 | 8/2008 | Ben-Shachar et al. |
| 7,441,198 B2 | 10/2008 | Dempski et al. |
| 7,478,339 B2 | 1/2009 | Pettiross et al. |
| 7,500,200 B2 | 3/2009 | Kelso et al. |
| 7,530,022 B2 | 5/2009 | Ben-Shachar et al. |
| 7,552,177 B2 | 6/2009 | Kessen et al. |
| 7,577,711 B2 | 8/2009 | McArdle |
| 7,584,258 B2 | 9/2009 | Maresh |
| 7,587,028 B1 | 9/2009 | Broerman et al. |
| 7,606,714 B2 | 10/2009 | Williams et al. |
| 7,606,862 B2 | 10/2009 | Swearingen et al. |
| 7,620,902 B2 | 11/2009 | Manion et al. |
| 7,634,533 B2 | 12/2009 | Rudolph et al. |
| 7,774,407 B2 | 8/2010 | Daly et al. |
| 7,792,277 B2 | 9/2010 | Shaffer et al. |
| 7,830,814 B1 | 11/2010 | Allen et al. |
| 7,840,013 B2 | 11/2010 | Dedieu et al. |
| 7,840,980 B2 | 11/2010 | Gutta |
| 7,881,450 B1 | 2/2011 | Gentle et al. |
| 7,920,160 B2 | 4/2011 | Tamaru et al. |
| 7,956,869 B1 | 6/2011 | Gilra |
| 7,986,372 B2 | 7/2011 | Ma et al. |
| 7,995,464 B1 | 8/2011 | Croak et al. |
| 8,059,557 B1 | 11/2011 | Sigg et al. |
| 8,081,205 B2 | 12/2011 | Baird et al. |
| 8,140,973 B2 | 3/2012 | Sandquist et al. |
| 8,169,463 B2 | 5/2012 | Enstad et al. |
| 8,219,624 B2 | 7/2012 | Haynes et al. |
| 8,274,893 B2 | 9/2012 | Bansal et al. |
| 8,290,998 B2 | 10/2012 | Stienhans et al. |
| 8,301,883 B2 | 10/2012 | Sundaram et al. |
| 8,340,268 B2 | 12/2012 | Knaz |
| 8,358,327 B2 | 1/2013 | Duddy |
| 8,423,615 B1 | 4/2013 | Hayes |
| 8,428,234 B2 | 4/2013 | Knaz |
| 8,433,061 B2 | 4/2013 | Cutler |
| 8,434,019 B2 | 4/2013 | Nelson |
| 8,456,507 B1 | 6/2013 | Mallappa et al. |
| 8,462,103 B1 | 6/2013 | Moscovitch et al. |
| 8,478,848 B2 | 7/2013 | Minert |
| 8,520,370 B2 | 8/2013 | Waitzman, III et al. |
| 8,625,749 B2 | 1/2014 | Jain et al. |
| 8,630,208 B1 | 1/2014 | Kjeldaas |
| 8,638,354 B2 | 1/2014 | Leow et al. |
| 8,645,464 B2 | 2/2014 | Zimmet et al. |
| 8,675,847 B2 | 3/2014 | Shaffer et al. |
| 8,694,587 B2 | 4/2014 | Chaturvedi et al. |
| 8,694,593 B1 | 4/2014 | Wren et al. |
| 8,706,539 B1 | 4/2014 | Mohler |
| 8,732,149 B2 | 5/2014 | Lida et al. |
| 8,738,080 B2 | 5/2014 | Nhiayi et al. |
| 8,751,572 B1 | 6/2014 | Behforooz et al. |
| 8,831,505 B1 | 9/2014 | Seshadri |
| 8,850,203 B2 | 9/2014 | Sundaram et al. |
| 8,860,774 B1 | 10/2014 | Sheeley et al. |
| 8,874,644 B2 | 10/2014 | Allen et al. |
| 8,890,924 B2 | 11/2014 | Wu |
| 8,892,646 B2 | 11/2014 | Chaturvedi et al. |
| 8,914,444 B2 | 12/2014 | Hladik, Jr. |
| 8,914,472 B1 | 12/2014 | Lee et al. |
| 8,924,862 B1 | 12/2014 | Luo |
| 8,930,840 B1 | 1/2015 | Riskó et al. |
| 8,947,493 B2 | 2/2015 | Lian et al. |
| 8,972,494 B2 | 3/2015 | Chen et al. |
| 9,003,445 B1 | 4/2015 | Rowe |
| 9,031,839 B2 | 5/2015 | Thorsen et al. |
| 9,032,028 B2 | 5/2015 | Davidson et al. |
| 9,075,572 B2 | 7/2015 | Ayoub et al. |
| 9,118,612 B2 | 8/2015 | Fish et al. |
| 9,131,017 B2 | 9/2015 | Kurupacheril et al. |
| 9,137,376 B1 | 9/2015 | Basart et al. |
| 9,143,729 B2 | 9/2015 | Anand et al. |
| 9,165,281 B2 | 10/2015 | Orsolini et al. |
| 9,197,701 B1 | 11/2015 | Petrov et al. |
| 9,197,848 B2 | 11/2015 | Felkai et al. |
| 9,201,527 B2 | 12/2015 | Kripalani et al. |
| 9,204,099 B2 | 12/2015 | Brown |
| 9,219,735 B2 | 12/2015 | Hoard et al. |
| 9,246,855 B2 | 1/2016 | Maehiro |
| 9,258,033 B2 | 2/2016 | Showering |
| 9,268,398 B2 | 2/2016 | Tipirneni |
| 9,298,342 B2 | 3/2016 | Zhang et al. |
| 9,323,417 B2 | 4/2016 | Sun et al. |
| 9,335,892 B2 | 5/2016 | Ubillos |
| 9,349,119 B2 | 5/2016 | Desai et al. |
| 9,367,224 B2 | 6/2016 | Ananthakrishnan et al. |
| 9,369,673 B2 | 6/2016 | Ma et al. |
| 9,407,621 B2 | 8/2016 | Vakil et al. |
| 9,432,512 B2 | 8/2016 | You |
| 9,449,303 B2 | 9/2016 | Underhill et al. |
| 9,495,664 B2 | 11/2016 | Cole et al. |
| 9,513,861 B2 | 12/2016 | Lin et al. |
| 9,516,022 B2 | 12/2016 | Borzycki et al. |
| 9,525,711 B2 | 12/2016 | Ackerman et al. |
| 9,553,799 B2 | 1/2017 | Tarricone et al. |
| 9,563,480 B2 | 2/2017 | Messerli et al. |
| 9,609,030 B2 | 3/2017 | Sun et al. |
| 9,609,514 B2 | 3/2017 | Mistry et al. |
| 9,614,756 B2 | 4/2017 | Joshi |
| 9,640,194 B1 | 5/2017 | Nemala et al. |
| 9,667,799 B2 | 5/2017 | Olivier et al. |
| 9,674,625 B2 | 6/2017 | Armstrong-Mutner |
| 9,712,569 B2 * | 7/2017 | Vashishtha ......... H04L 65/1089 |
| 9,762,709 B1 | 9/2017 | Snyder et al. |
| 2001/0030661 A1 | 10/2001 | Reichardt |
| 2002/0018051 A1 | 2/2002 | Singh |
| 2002/0076003 A1 | 6/2002 | Zellner et al. |
| 2002/0078153 A1 | 6/2002 | Chung et al. |
| 2002/0140736 A1 | 10/2002 | Chen |
| 2002/0188522 A1 | 12/2002 | McCall et al. |
| 2003/0028647 A1 | 2/2003 | Grosu |
| 2003/0046421 A1 | 3/2003 | Horvitz et al. |
| 2003/0068087 A1 | 4/2003 | Wu et al. |
| 2003/0154250 A1 | 8/2003 | Miyashita |
| 2003/0174826 A1 | 9/2003 | Hesse |

(56) References Cited

U.S. PATENT DOCUMENTS

| | | |
|---|---|---|
| 2003/0187800 A1 | 10/2003 | Moore et al. |
| 2003/0197739 A1 | 10/2003 | Bauer |
| 2003/0227423 A1 | 12/2003 | Arai et al. |
| 2004/0039909 A1 | 2/2004 | Cheng |
| 2004/0054885 A1 | 3/2004 | Bartram et al. |
| 2004/0098456 A1 | 5/2004 | Krzyzanowski et al. |
| 2004/0210637 A1 | 10/2004 | Loveland |
| 2004/0253991 A1 | 12/2004 | Azuma |
| 2004/0267938 A1 | 12/2004 | Shoroff et al. |
| 2005/0014490 A1 | 1/2005 | Desai et al. |
| 2005/0031136 A1 | 2/2005 | Du et al. |
| 2005/0048916 A1 | 3/2005 | Suh |
| 2005/0055405 A1 | 3/2005 | Kaminsky et al. |
| 2005/0055412 A1 | 3/2005 | Kaminsky et al. |
| 2005/0085243 A1 | 4/2005 | Boyer et al. |
| 2005/0099492 A1 | 5/2005 | Orr |
| 2005/0108328 A1 | 5/2005 | Berkeland et al. |
| 2005/0131774 A1 | 6/2005 | Huxter |
| 2005/0175208 A1 | 8/2005 | Shaw et al. |
| 2005/0215229 A1 | 9/2005 | Cheng |
| 2005/0226511 A1 | 10/2005 | Short |
| 2005/0231588 A1 | 10/2005 | Yang et al. |
| 2005/0286711 A1 | 12/2005 | Lee et al. |
| 2006/0004911 A1 | 1/2006 | Becker et al. |
| 2006/0020697 A1 | 1/2006 | Kelso et al. |
| 2006/0026255 A1 | 2/2006 | Malamud et al. |
| 2006/0083305 A1 | 4/2006 | Dougherty et al. |
| 2006/0084471 A1 | 4/2006 | Walter |
| 2006/0164552 A1 | 7/2006 | Cutler |
| 2006/0224430 A1 | 10/2006 | Butt |
| 2006/0250987 A1 | 11/2006 | White et al. |
| 2006/0271624 A1 | 11/2006 | Lyle et al. |
| 2007/0005752 A1 | 1/2007 | Chawla et al. |
| 2007/0021973 A1 | 1/2007 | Stremler |
| 2007/0025576 A1 | 2/2007 | Wen |
| 2007/0041366 A1 | 2/2007 | Vugenfirer et al. |
| 2007/0047707 A1 | 3/2007 | Mayer et al. |
| 2007/0058842 A1 | 3/2007 | Vallone et al. |
| 2007/0067387 A1 | 3/2007 | Jain et al. |
| 2007/0091831 A1 | 4/2007 | Croy et al. |
| 2007/0100986 A1 | 5/2007 | Bagley et al. |
| 2007/0106747 A1 | 5/2007 | Singh et al. |
| 2007/0116225 A1 | 5/2007 | Zhao et al. |
| 2007/0139626 A1 | 6/2007 | Saleh et al. |
| 2007/0150453 A1 | 6/2007 | Morita |
| 2007/0168444 A1 | 7/2007 | Chen et al. |
| 2007/0198637 A1 | 8/2007 | Deboy et al. |
| 2007/0208590 A1 | 9/2007 | Dorricott et al. |
| 2007/0248244 A1 | 10/2007 | Sato et al. |
| 2007/0250567 A1 | 10/2007 | Graham et al. |
| 2008/0059986 A1 | 3/2008 | Kalinowski et al. |
| 2008/0068447 A1 | 3/2008 | Mattila et al. |
| 2008/0071868 A1 | 3/2008 | Arenburg et al. |
| 2008/0080532 A1 | 4/2008 | O'Sullivan et al. |
| 2008/0107255 A1 | 5/2008 | Geva et al. |
| 2008/0133663 A1 | 6/2008 | Lentz |
| 2008/0154863 A1 | 6/2008 | Goldstein |
| 2008/0209452 A1 | 8/2008 | Ebert et al. |
| 2008/0270211 A1 | 10/2008 | Vander Veen et al. |
| 2008/0278894 A1 | 11/2008 | Chen et al. |
| 2009/0012963 A1 | 1/2009 | Johnson et al. |
| 2009/0019374 A1 | 1/2009 | Logan et al. |
| 2009/0049151 A1 | 2/2009 | Pagan |
| 2009/0064245 A1 | 3/2009 | Facemire et al. |
| 2009/0075633 A1 | 3/2009 | Lee et al. |
| 2009/0089822 A1 | 4/2009 | Wada |
| 2009/0094088 A1 | 4/2009 | Chen et al. |
| 2009/0100142 A1 | 4/2009 | Stern et al. |
| 2009/0119373 A1 | 5/2009 | Denner et al. |
| 2009/0132949 A1 | 5/2009 | Bosarge |
| 2009/0193327 A1* | 7/2009 | Roychoudhuri ...... G06F 17/241 715/231 |
| 2009/0234667 A1 | 9/2009 | Thayne |
| 2009/0254619 A1 | 10/2009 | Kho et al. |
| 2009/0256901 A1 | 10/2009 | Mauchly et al. |
| 2009/0278851 A1 | 11/2009 | Ach et al. |
| 2009/0282104 A1 | 11/2009 | O'Sullivan et al. |
| 2009/0292999 A1 | 11/2009 | LaBine et al. |
| 2009/0296908 A1 | 12/2009 | Lee et al. |
| 2009/0306981 A1 | 12/2009 | Cromack et al. |
| 2009/0309846 A1 | 12/2009 | Trachtenberg et al. |
| 2009/0313334 A1 | 12/2009 | Seacat et al. |
| 2010/0005142 A1* | 1/2010 | Xiao ...................... G06Q 10/10 709/204 |
| 2010/0005402 A1 | 1/2010 | George et al. |
| 2010/0031192 A1 | 2/2010 | Kong |
| 2010/0061538 A1* | 3/2010 | Coleman ............. H04L 12/1818 379/202.01 |
| 2010/0070640 A1* | 3/2010 | Allen, Jr. ............... G06Q 10/10 709/229 |
| 2010/0073454 A1 | 3/2010 | Lovhaugen et al. |
| 2010/0077109 A1 | 3/2010 | Yan et al. |
| 2010/0094867 A1 | 4/2010 | Badros et al. |
| 2010/0095327 A1 | 4/2010 | Fujinaka et al. |
| 2010/0121959 A1 | 5/2010 | Lin et al. |
| 2010/0131856 A1 | 5/2010 | Kalbfleisch et al. |
| 2010/0157978 A1 | 6/2010 | Robbins et al. |
| 2010/0162170 A1 | 6/2010 | Johns et al. |
| 2010/0183179 A1 | 7/2010 | Griffin, Jr. et al. |
| 2010/0211872 A1 | 8/2010 | Rolston et al. |
| 2010/0211911 A1* | 8/2010 | Logan .................. G06Q 10/109 715/808 |
| 2010/0215334 A1 | 8/2010 | Miyagi |
| 2010/0220615 A1 | 9/2010 | Enstrom et al. |
| 2010/0241691 A1 | 9/2010 | Savitzky et al. |
| 2010/0245535 A1 | 9/2010 | Mauchly |
| 2010/0250817 A1 | 9/2010 | Collopy et al. |
| 2010/0262266 A1 | 10/2010 | Chang et al. |
| 2010/0262925 A1 | 10/2010 | Liu et al. |
| 2010/0275164 A1 | 10/2010 | Morikawa |
| 2010/0302033 A1 | 12/2010 | Devenyi et al. |
| 2010/0303227 A1 | 12/2010 | Gupta |
| 2010/0316207 A1 | 12/2010 | Brunson |
| 2010/0318399 A1 | 12/2010 | Li et al. |
| 2011/0072037 A1 | 3/2011 | Lotzer |
| 2011/0075830 A1 | 3/2011 | Dreher et al. |
| 2011/0087745 A1 | 4/2011 | O'Sullivan et al. |
| 2011/0093548 A1* | 4/2011 | Das ....................... G06Q 10/10 709/206 |
| 2011/0117535 A1 | 5/2011 | Benko et al. |
| 2011/0131498 A1 | 6/2011 | Chao et al. |
| 2011/0154427 A1 | 6/2011 | Wei |
| 2011/0230209 A1 | 9/2011 | Kilian |
| 2011/0264928 A1 | 10/2011 | Hinckley |
| 2011/0270609 A1 | 11/2011 | Jones et al. |
| 2011/0271211 A1 | 11/2011 | Jones et al. |
| 2011/0283226 A1 | 11/2011 | Basson et al. |
| 2011/0314139 A1 | 12/2011 | Song et al. |
| 2012/0009890 A1 | 1/2012 | Curcio et al. |
| 2012/0013704 A1 | 1/2012 | Sawayanagi et al. |
| 2012/0013768 A1 | 1/2012 | Zurek et al. |
| 2012/0026279 A1 | 2/2012 | Kato |
| 2012/0054288 A1 | 3/2012 | Wiese et al. |
| 2012/0072364 A1 | 3/2012 | Ho |
| 2012/0084714 A1 | 4/2012 | Sirpal et al. |
| 2012/0092436 A1 | 4/2012 | Pahud et al. |
| 2012/0140970 A1 | 6/2012 | Kim et al. |
| 2012/0179502 A1 | 7/2012 | Farooq et al. |
| 2012/0190386 A1 | 7/2012 | Anderson |
| 2012/0192075 A1 | 7/2012 | Ebtekar et al. |
| 2012/0233020 A1 | 9/2012 | Eberstadt et al. |
| 2012/0246229 A1 | 9/2012 | Carr et al. |
| 2012/0246596 A1 | 9/2012 | Ording et al. |
| 2012/0284635 A1 | 11/2012 | Sitrick et al. |
| 2012/0296957 A1 | 11/2012 | Stinson et al. |
| 2012/0303476 A1 | 11/2012 | Krzyzanowski et al. |
| 2012/0306757 A1 | 12/2012 | Keist et al. |
| 2012/0306993 A1 | 12/2012 | Sellers-Blais |
| 2012/0308202 A1 | 12/2012 | Murata et al. |
| 2012/0313971 A1 | 12/2012 | Murata et al. |
| 2012/0315011 A1 | 12/2012 | Messmer et al. |
| 2012/0321058 A1 | 12/2012 | Eng et al. |
| 2012/0323645 A1 | 12/2012 | Spiegel et al. |
| 2012/0324512 A1 | 12/2012 | Cahnbley et al. |

(56) References Cited

U.S. PATENT DOCUMENTS

| | | |
|---|---|---|
| 2013/0027425 A1 | 1/2013 | Yuan |
| 2013/0038675 A1 | 2/2013 | Malik |
| 2013/0047093 A1 | 2/2013 | Reuschel et al. |
| 2013/0050398 A1 | 2/2013 | Krans et al. |
| 2013/0055112 A1 | 2/2013 | Joseph et al. |
| 2013/0061054 A1 | 3/2013 | Niccolai |
| 2013/0063542 A1* | 3/2013 | Bhat ............... H04N 7/15 348/14.03 |
| 2013/0086633 A1 | 4/2013 | Schultz |
| 2013/0090065 A1 | 4/2013 | Fisunenko et al. |
| 2013/0091205 A1 | 4/2013 | Kotler et al. |
| 2013/0091440 A1 | 4/2013 | Kotler et al. |
| 2013/0094647 A1 | 4/2013 | Mauro et al. |
| 2013/0113602 A1 | 5/2013 | Gilbertson et al. |
| 2013/0113827 A1 | 5/2013 | Forutanpour et al. |
| 2013/0120522 A1 | 5/2013 | Lian et al. |
| 2013/0124551 A1 | 5/2013 | Foo |
| 2013/0129252 A1 | 5/2013 | Lauper et al. |
| 2013/0135837 A1 | 5/2013 | Kemppinen |
| 2013/0141371 A1 | 6/2013 | Hallford et al. |
| 2013/0148789 A1 | 6/2013 | Hillier et al. |
| 2013/0182063 A1 | 7/2013 | Jaiswal et al. |
| 2013/0185672 A1 | 7/2013 | McCormick et al. |
| 2013/0198629 A1 | 8/2013 | Tandon et al. |
| 2013/0198656 A1* | 8/2013 | Jones ............... H04L 67/36 715/758 |
| 2013/0210496 A1 | 8/2013 | Zakarias et al. |
| 2013/0211826 A1 | 8/2013 | Mannby |
| 2013/0212202 A1 | 8/2013 | Lee |
| 2013/0215215 A1 | 8/2013 | Gage et al. |
| 2013/0219278 A1 | 8/2013 | Rosenberg |
| 2013/0222246 A1 | 8/2013 | Booms et al. |
| 2013/0225080 A1 | 8/2013 | Doss et al. |
| 2013/0227433 A1 | 8/2013 | Doray et al. |
| 2013/0235866 A1 | 9/2013 | Tian et al. |
| 2013/0242030 A1 | 9/2013 | Kato et al. |
| 2013/0243213 A1 | 9/2013 | Moquin |
| 2013/0252669 A1 | 9/2013 | Nhiayi |
| 2013/0263020 A1 | 10/2013 | Heiferman et al. |
| 2013/0290421 A1 | 10/2013 | Benson et al. |
| 2013/0297704 A1 | 11/2013 | Alberth, Jr. et al. |
| 2013/0300637 A1 | 11/2013 | Smits et al. |
| 2013/0325970 A1 | 12/2013 | Roberts et al. |
| 2013/0329865 A1 | 12/2013 | Ristock et al. |
| 2013/0335507 A1 | 12/2013 | Aarrestad et al. |
| 2014/0012990 A1 | 1/2014 | Ko |
| 2014/0028781 A1 | 1/2014 | MacDonald |
| 2014/0040404 A1 | 2/2014 | Pujare Sanjay et al. |
| 2014/0040819 A1 | 2/2014 | Duffy |
| 2014/0063174 A1 | 3/2014 | Junuzovic et al. |
| 2014/0068452 A1 | 3/2014 | Joseph et al. |
| 2014/0068670 A1 | 3/2014 | Timmermann et al. |
| 2014/0078182 A1 | 3/2014 | Utsunomiya |
| 2014/0108486 A1 | 4/2014 | Borzycki et al. |
| 2014/0111597 A1 | 4/2014 | Anderson et al. |
| 2014/0136630 A1 | 5/2014 | Siegel et al. |
| 2014/0157338 A1 | 6/2014 | Pearce |
| 2014/0161243 A1* | 6/2014 | Contreras ............... H04M 3/56 379/202.01 |
| 2014/0195557 A1 | 7/2014 | Oztaskent et al. |
| 2014/0198175 A1 | 7/2014 | Shaffer et al. |
| 2014/0237371 A1* | 8/2014 | Klemm ............... G06Q 10/109 715/730 |
| 2014/0253671 A1 | 9/2014 | Bentley et al. |
| 2014/0280595 A1 | 9/2014 | Mani et al. |
| 2014/0282213 A1 | 9/2014 | Musa et al. |
| 2014/0289326 A1* | 9/2014 | McCormack ....... H04L 65/1006 709/204 |
| 2014/0296112 A1 | 10/2014 | O'Driscoll et al. |
| 2014/0298210 A1 | 10/2014 | Park et al. |
| 2014/0317561 A1 | 10/2014 | Robinson et al. |
| 2014/0337840 A1 | 11/2014 | Hyde et al. |
| 2014/0351327 A1 | 11/2014 | Huang et al. |
| 2014/0358264 A1 | 12/2014 | Long et al. |
| 2014/0372908 A1* | 12/2014 | Kashi ............... H04L 65/403 715/753 |
| 2015/0004571 A1* | 1/2015 | Ironside ............... G09B 5/10 434/185 |
| 2015/0009278 A1 | 1/2015 | Modai et al. |
| 2015/0029301 A1 | 1/2015 | Nakatomi et al. |
| 2015/0067552 A1 | 3/2015 | Leorin et al. |
| 2015/0070835 A1 | 3/2015 | Mclean |
| 2015/0074189 A1 | 3/2015 | Cox et al. |
| 2015/0081885 A1 | 3/2015 | Thomas et al. |
| 2015/0082350 A1 | 3/2015 | Ogasawara et al. |
| 2015/0085060 A1 | 3/2015 | Fish et al. |
| 2015/0088575 A1 | 3/2015 | Asli et al. |
| 2015/0089393 A1 | 3/2015 | Zhang et al. |
| 2015/0089394 A1 | 3/2015 | Chen et al. |
| 2015/0113050 A1 | 4/2015 | Stahl |
| 2015/0113369 A1 | 4/2015 | Chan et al. |
| 2015/0128068 A1 | 5/2015 | Kim |
| 2015/0172120 A1 | 6/2015 | Dwarampudi et al. |
| 2015/0178626 A1 | 6/2015 | Pielot et al. |
| 2015/0215365 A1 | 7/2015 | Shaffer et al. |
| 2015/0254760 A1 | 9/2015 | Pepper |
| 2015/0288774 A1 | 10/2015 | Larabie-Belanger |
| 2015/0301691 A1 | 10/2015 | Qin |
| 2015/0304120 A1 | 10/2015 | Xiao et al. |
| 2015/0304366 A1 | 10/2015 | Bader-Natal et al. |
| 2015/0319113 A1 | 11/2015 | Gunderson et al. |
| 2015/0350126 A1 | 12/2015 | Xue |
| 2015/0373063 A1* | 12/2015 | Vashishtha ......... H04L 65/1089 348/14.07 |
| 2015/0373414 A1 | 12/2015 | Kinoshita |
| 2016/0037304 A1 | 2/2016 | Dunkin et al. |
| 2016/0043986 A1 | 2/2016 | Ronkainen |
| 2016/0044159 A1 | 2/2016 | Wolff et al. |
| 2016/0044380 A1 | 2/2016 | Barrett |
| 2016/0050079 A1* | 2/2016 | Martin De Nicolas ............... H04M 3/533 455/416 |
| 2016/0050160 A1 | 2/2016 | Li et al. |
| 2016/0050175 A1 | 2/2016 | Chaudhry et al. |
| 2016/0070758 A1 | 3/2016 | Thomson et al. |
| 2016/0071056 A1 | 3/2016 | Ellison et al. |
| 2016/0072862 A1 | 3/2016 | Bader-Natal et al. |
| 2016/0094593 A1 | 3/2016 | Priya |
| 2016/0105345 A1 | 4/2016 | Kim et al. |
| 2016/0110056 A1 | 4/2016 | Hong et al. |
| 2016/0165056 A1 | 6/2016 | Bargetzi et al. |
| 2016/0173537 A1 | 6/2016 | Kumar et al. |
| 2016/0266609 A1 | 9/2016 | McCracken |
| 2016/0269411 A1 | 9/2016 | Malachi |
| 2016/0277461 A1 | 9/2016 | Sun et al. |
| 2016/0283909 A1 | 9/2016 | Adiga |
| 2016/0307165 A1 | 10/2016 | Grodum Nicolai et al. |
| 2016/0309037 A1 | 10/2016 | Rosenberg et al. |
| 2016/0321347 A1 | 11/2016 | Zhou et al. |
| 2017/0006162 A1 | 1/2017 | Bargetzi et al. |
| 2017/0006446 A1 | 1/2017 | Harris et al. |
| 2017/0070706 A1 | 3/2017 | Ursin et al. |
| 2017/0093874 A1 | 3/2017 | Uthe |
| 2017/0104961 A1 | 4/2017 | Pan et al. |
| 2017/0171260 A1 | 6/2017 | Jerrard-Dunne et al. |
| 2017/0324850 A1 | 11/2017 | Snyder et al. |

FOREIGN PATENT DOCUMENTS

| | | |
|---|---|---|
| CN | 102572370 | 7/2012 |
| CN | 102655583 | 9/2012 |
| CN | 101729528 | 11/2012 |
| CN | 102938834 | 2/2013 |
| CN | 103141086 | 6/2013 |
| CN | 204331453 | 5/2015 |
| DE | 3843033 | 9/1991 |
| EP | 959585 | 11/1999 |
| EP | 2773131 | 9/2014 |
| EP | 2341686 | 8/2016 |
| WO | WO 98/55903 | 12/1998 |

(56) References Cited

FOREIGN PATENT DOCUMENTS

| | | |
|---|---|---|
| WO | WO 2008/139269 | 11/2008 |
| WO | WO 2012/167262 | 12/2012 |
| WO | WO 2014/118736 | 8/2014 |

OTHER PUBLICATIONS

Cisco Systems, Inc., "Cisco WebEx Meetings Server System Requirements release 1.5." 30 pages, Aug. 14, 2013.
Thompson, Phil, et al., "Chapter 10: Agent Based Ontology Driven Virtual Meeting Assistant," Future Generation Information Technology, Springer Berlin Heidelberg, Abstract Only, 2010.
Author Unknown, "A Primer on the H.323 Series Standard," Version 2.0, http://www.packetizer.com/voip/h323/papers/primer/ Downloaded from the Internet Dec. 20, 2006, 17 pages.
Author Unknown, "Active screen follows mouse and dual monitors," KDE Community Forums, Apr. 13, 2010, 3 pages.
Author Unknown, "Implementing Media Gateway Control Protocols" a RADVision White Paper, Jan. 27, 2002, 16 pages.
AVERUSA, "Interactive Video Conferencing K-12 applications," "Interactive Video Conferencing K-12 applications" copyright 2012. http://www.averusa.com/education/downloads/hvc brochure goved. pdf (last accessed Oct. 11, 2013).
Clarke, Brant, "Polycom Announces RealPresence Group Series" "Polycom Announces ReapPresence Group Series" dated Oct. 8, 2012 available at http://www.323.tv/news/polycom-realpresence-group-series (last accessed Oct. 11, 2013).
Clauser, Grant, et al., "Is the Google Home the voice-controlled speaker for you?," The Wire Cutter, Nov. 22, 2016, pp. 1-15.
Cole, Camille, et al., "Videoconferencing for K-12 Classrooms," Second Edition (excerpt), http://www.iste.org/docs/excerpts/VIDCO2-excerpt.pdf (last accessed 1011-2013), 2009.
Epson, "BrightLink Pro Projector," BrightLink Pro Projector. http://www.epson.com/cgi-bin/Store/isp/Landing/brightlink-pro-interactive-projectors.do?ref=van brightlink-pro—dated 2013 (last accessed Oct. 11, 2013).
InFocus, "Mondopad," Mondopad. http://www.infocus.com/sites/default/files/InFocus-Mondopad-INF5520a-INF7021-Datasheet-EN. pdf (last accessed Oct. 11, 2013), 2013.
MacCormick, John, "Video Chat with Multiple Cameras," CSCW '13, Proceedings of the 2013 conference on Computer supported cooperative work companion, pp. 195-198, ACM, New York, NY, USA, 2013.
Microsoft, "Positioning Objects on Multiple Display Monitors," Aug. 12, 2012, 2 pages.
Mullins, Robert, "Polycom Adds Tablet Videoconferencing," Mullins, R. "Polycom Adds Tablet Videoconferencing" available at http://www.informationweek.com/telecom/unified-communications/polycom-adds-tablet-videoconferencing-231900680 dated Oct. 12, 2011 (last accessed Oct. 11, 2013).
Nu-Star Technologies, "Interactive Whiteboard Conferencing," Interactive Whiteboard Conferencing. http://www.nu-star.com/interactive-conf.php dated 2013 (last accessed Oct. 11, 2013).
Polycom, "Polycom RealPresence Mobile: Mobile Telepresence & Video Conferencing," http://www.polycom/products-services/hd-telepresence-video-conferencing/realpresence-mobile.html#stab1 (last accessed Oct. 11, 2013), 2013.
Polycom, "Polycom Turns Video Display Screens into Virtual Whiteboards with First Integrated Whiteboard Solution for Video Collaboration," Polycom Turns Video Display Screens into Virtual Whiteboards with First Integrated Whiteboard Solution for Video Collaboration—http://www.polycom/company/news/press-releases/2011/20111027 2.html—dated Oct. 27, 2011.
Polycom, "Polycom UC Board Specifications," 2012, Polycom, Inc., San Jose, CA, http://www.uatg.com/pdf/polycom/polycom-uc-board- datasheet.pdf, (last accessed Oct. 11, 2013).
Stodle. Daniel, et al., "Gesture-Based, Touch-Free Multi-User Gaming on Wall-Sized, High-Resolution Tiled Displays," 2008, 13 pages.
Tno, "Multi-Touch Interaction Overview," Dec. 1, 2009, 12 pages.
Toga, James, et al., "Demystifying Multimedia Conferencing Over the Internet Using the H.323 Set of Standards," Intel Technology Journal Q2, 1998, 11 pages.
Ubuntu, "Force Unity to open new window on the screen where the cursor is?" Sep. 16, 2013, 1 page.
VB Forums, "Pointapi," Aug. 8, 2001, 3 pages.
Vidyo, "VidyoPanorama," VidyoPanorama—http://www.vidyo.com/products/vidyopanorama/ dated 2013 (last accessed Oct. 11, 2013).
Author Unknown, ""I can see the future" 10 predictions concerning cell-phones," Surveillance Camera Players, htt://www.notbored.org/cell-phones.html, Jun. 21, 2003, 2 pages.
Author Unknown, "Manage Meeting Rooms in Real Time," Jan. 23, 2017, door-tablet.com, 7 pages.
Stevenson, Nancy, "Webex Web Meetings for Dummies" 2005, Wiley Publishing Inc., Indianapolis, Indiana, USA, 339 pages.
Choi, Jae Young, et al; "Towards an Automatic Face Indexing System for Actor-based Video Services in an IPTV Environment," IEEE Transactions on 56, No. 1 (2010): 147-155.
Cisco Systems, Inc. "Cisco webex: WebEx Meeting Center User Guide for Hosts, Presenters, and Participants" ©1997-2013, pp. 1-394 plus table of contents.
Cisco Systems, Inc., "Cisco Webex Meetings for iPad and iPhone Release Notes," Version 5.0, Oct. 2013, 5 pages.
Cisco Systems, Inc., "Cisco Unified Personal Communicator 8.5", 2011, 9 pages.
Eichen, Elliot, et al., "Smartphone Docking Stations and Strongly Converged VoIP Clients for Fixed-Mobile convergence," IEEE Wireless Communications and Networking Conference: Services, Applications and Business, 2012, pp. 3140-3144.
Grothaus, Michael, "How Interactive Product Placements Could Save Television," Jul. 25, 2013, 4 pages.
Hannigan, Nancy Kruse, et al., The IBM Lotus Samteime VB Family Extending the IBM Unified Communications and Collaboration Strategy (2007), available at http://www.ibm.com/developerworks/lotus/library/sametime8-new/, 10 pages.
Hirschmann, Kenny, "TWIDDLA: Smarter Than the Average Whiteboard," Apr. 17, 2014, 2 pages.
Nyamgondalu, Nagendra, "Lotus Notes Calendar and Scheduling Explained!" IBM, Oct. 18, 2004, 10 pages.
Schreiber, Danny, "The Missing Guide for Google Hangout Video Calls," Jun. 5, 2014, 6 pages.
Shervington, Martin, "Complete Guide to Google Hangouts for Businesses and Individuals," Mar. 20, 2014, 15 pages.
Shi, Saiqi, et al, "Notification That a Mobile Meeting Attendee Is Driving", May 20, 2013, 13 pages.

\* cited by examiner

OFFLINE VIRTUAL PARTICIPATION IN AN ONLINE CONFERENCE MEETING

TECHNICAL FIELD

The present technology pertains to online conference meetings, and more specifically pertains to displaying a previous recording during an online conference meeting.

BACKGROUND

Conventional meetings can be in-person meetings, telephone conferencing meetings and/or online conference meetings. An online conference meeting allows users to connect to a meeting via the Internet. An online conference meeting, such as a WebEx™ meeting, can be referred to as web plus phone sharing or web conferencing. For example, users can participate via a telephone, smart phone, tablet, laptop and/or computer. Online conference meetings allow users to share audio and desktop sharing. Desktop sharing can include sharing presentations such as a PowerPoint™ presentation, documents such as a Word™ document, a web browser or other content that can be displayed on a display screen of a device coupled to an online conference meeting via a network.

A common problem encountered in conventional meetings is attendance. Typically the participants can include one or more hosts, presenters, key audience members and/or important audience members. Depending on which participant or participants cannot attend a meeting, the meeting can go on as scheduled, postponed, or in some cases, never even occur. Even if the meeting goes on as scheduled, missing a participant can impact the effectiveness of the meeting. When one or more participants cannot attend a meeting, several approaches can occur. One approach is to re-schedule the meeting provided a mutual time can be agreed upon. When a deadline is approaching, finding a mutual time can be difficult. Another approach is to split the meeting into multiple meetings. However, having multiple meetings can take more time and can require specific participants to be at each meeting. If a key audience member cannot attend each of the meetings, then one or more of the meetings may have to be rescheduled. If one or more presenters cannot attend a meeting, the one or more presenters can send materials prior to the meeting. However, the participants may need to read the material before the meeting and/or if they have a question, the question may not be answered until after the meeting. If a meeting is recorded, content that is not shared during the meeting due to a participant's absence may not be available for future reference. When multiple presenters are required, the absence of a first presenter can impact the effectiveness of a second presenter.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview: disclosed are systems, methods, and non-transitory computer-readable storage media for allowing an invitee to record a presentation prior to an online conference meeting. For example, invitations to an upcoming meeting hosted on an online conferencing system can be sent by a conference server. The invitation can have a meeting time associated with the meeting. The conference server can receive a request by an invitee of the upcoming meeting. The request can be to access the upcoming meeting prior to the meeting time. In response to the request, the invitee can record a presentation for the upcoming meeting. During the online conference, the recorded presentation can be played.
Description The disclosed technology addresses the need in the art to allow a meeting invitee to pre-record a presentation for an upcoming online conference meeting. By pre-recording the presentation, an invitee who cannot attend the online conference meeting or who cannot fully participate in the meeting, can allow the meeting to occur and present information that can be necessary for the meeting. By pre-recording the presentation, the online conference meeting can be more effective than an online conference meeting without the pre-recorded presentation. Disclosed are systems, methods, and computer-readable storage media for allowing an invitee to record a presentation prior to an online conference meeting. As one of ordinary skill in the art will readily recognize, the examples and technologies provided above are simply for clarity and explanation purposes, and can include many additional concepts and variations.

Figure 1:
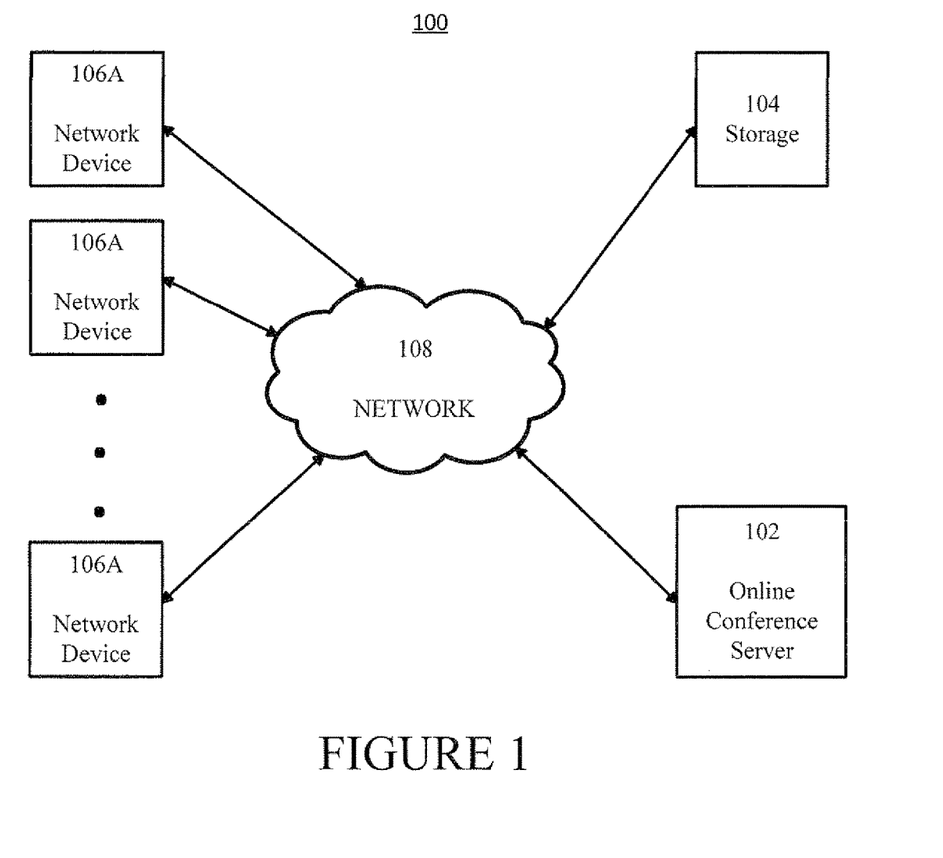
FIG. 1 illustrates a block diagram of an online conference meeting architecture in accordance with an exemplary embodiment.

Referring to FIG. 1, a block diagram of an online conference meeting architecture in accordance with an exemplary embodiment is illustrated. As shown, the online conference meeting architecture 100 can include an online conference server 102, storage 104, network devices 106a, 106b . . . 106n (collectively referred to as "106") and one or more networks 108. The online conference server 102 and storage 104 are shown as single components, but as known in the art, can be one or more components. The storage 104 can store content, such as documents, media items, or applications, which can be accessed by one or more network devices 106 via the one or more networks 108. For example, the online conference server 102 can comprise multiple servers. The online conference server 102 can service one or more discrete conferences. To this end, the online conference server 102 can enable one or more participants to communicate with the online conference server 102, as well as any of the network devices 106, to establish one or more conferences. Each conference can include one or more types of media, such as audio, video, text, and so forth. The online conference server 102 can implement various protocols to establish the conference with the network devices 106. For example, the online conference server 102 can implement Session Initiation Protocol (SIP) for signaling, HTTP, HTTPS, TCP, UDP, TLS, or any other protocol for establishing a communication session.

In some cases, the online conference server 102 can establish a communication session with each of the network devices 106 based on specific capabilities of each network device 106. Here, the online conference server 102 can use different protocols to communicate with the network devices 106 based on the settings or capabilities of each respective network device 106. For example, the online conference server 102 may use SIP to establish a communication session with network device 106a and otherwise establish a communication session with network device 106b using HTTP and TCP or UDP. The network devices 106 can include, but are not limited to, a telephone, a video conferencing client, a smartphone, a tablet computer, a laptop, a server, a conferencing system, or any other device that allows a participant to communicatively couple with the online conference server 102. Some participants can be communicatively coupled to the online conference server 102 via one or more devices, such as via a laptop and a telephone. The one or more networks 108 can include, for example, a public network, such a wide area network (WAN); a private network, such as a local area network (LAN); or a hybrid, such as a virtual private network (VPN).

The one or more networks 108 can be a geographically distributed collection of nodes interconnected by communication links and segments for transporting data between endpoints, such as personal computers and workstations. Many types of networks are available, with the types ranging from local area networks (LANs) and wide area networks (WANs) to overlay and software-defined networks, such as virtual extensible local area networks (VXLANs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective "size" of each network.

Overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs).

Moreover, overlay networks can include virtual segments, such as VXLAN segments in a VXLAN overlay network, which can include virtual L2 and/or L3 overlay networks over which VMs communicate. The virtual segments can be identified through a virtual network identifier (VNI), such as a VXLAN network identifier, which can specifically identify an associated virtual segment or domain.

Network virtualization allows hardware and software resources to be combined in a virtual network. For example, network virtualization can allow multiple numbers of VMs to be attached to the physical network via respective virtual LANs (VLANs). The VMs can be grouped according to their respective VLAN, and can communicate with other VMs as well as other devices on the internal or external network.

Network segments, such as physical or virtual segments; networks; devices; ports; physical or logical links; and/or traffic in general can be grouped into a bridge or flood domain. A bridge domain or flood domain can represent a broadcast domain, such as an L2 broadcast domain. A bridge domain or flood domain can include a single subnet, but can also include multiple subnets. Moreover, a bridge domain can be associated with a bridge domain interface on a network device, such as a switch. A bridge domain interface can be a logical interface which supports traffic between an L2 bridged network and an L3 routed network. In addition, a bridge domain interface can support internet protocol (IP) termination, VPN termination, address resolution handling, MAC addressing, etc. Both bridge domains and bridge domain interfaces can be identified by a same index or identifier.

Furthermore, endpoint groups (EPGs) can be used in a network for mapping applications to the network. In particular, EPGs can use a grouping of application endpoints in a network to apply connectivity and policy to the group of applications. EPGs can act as a container for buckets or collections of applications, or application components, and tiers for implementing forwarding and policy logic. EPGs also allow separation of network policy, security, and forwarding from addressing by instead using logical application boundaries.

Figure 2A:
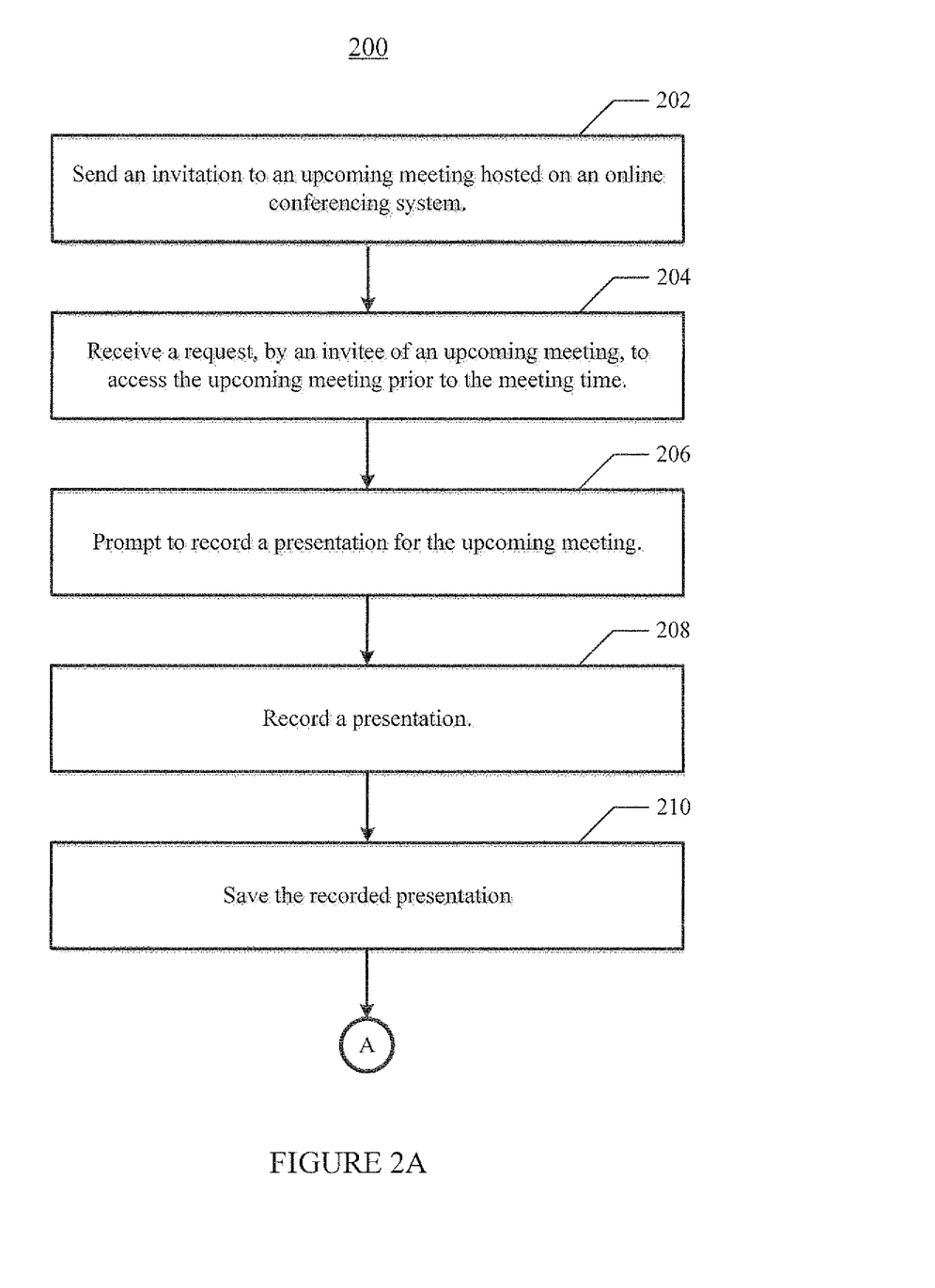
FIGS. 2A and 2B illustrate a flowchart for conducting an online conference meeting having a pre-recorded presentation in accordance with an exemplary embodiment.
Figure 2B:
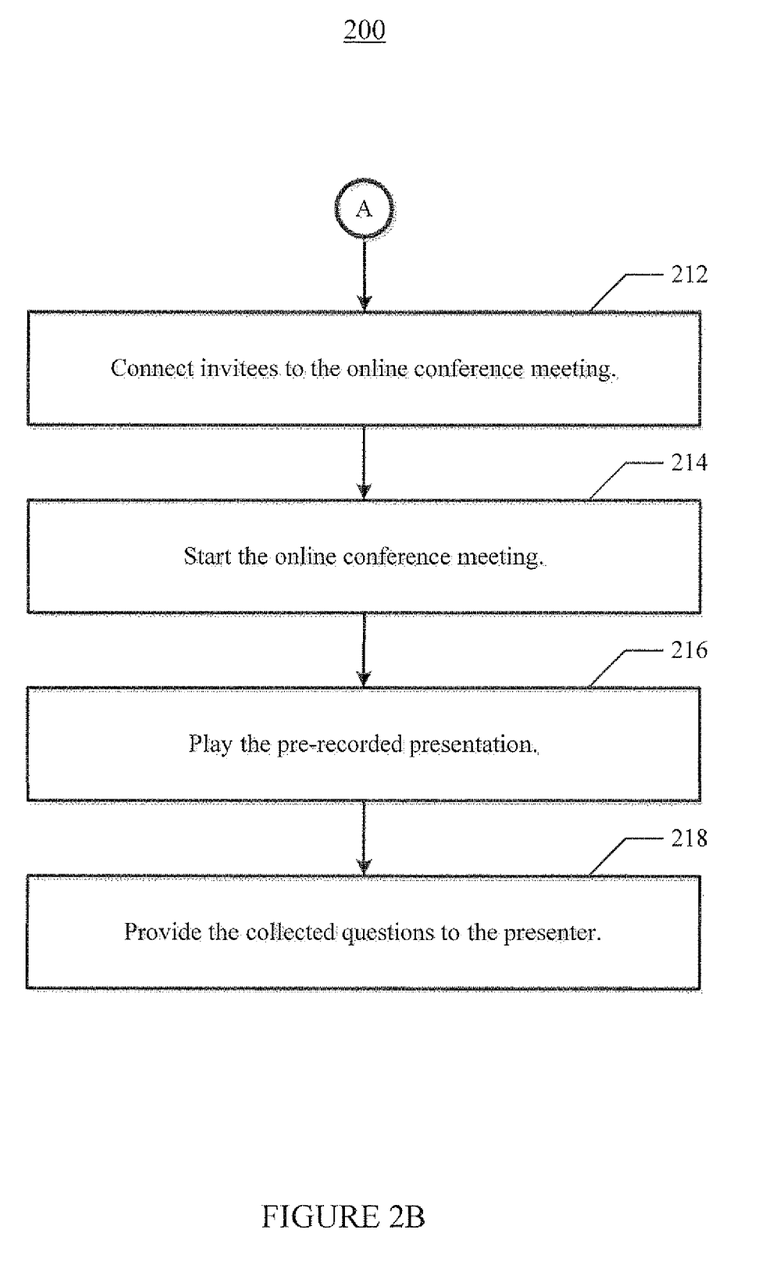

Referring to FIGS. 2A and 2B, a flowchart for conducting an online conference meeting having a pre-recorded presentation in accordance with an exemplary embodiment is illustrated. The exemplary method 200 is provided by way of example, as there are a variety of ways to carry out the method. The method 200 described below can be carried out using the configurations illustrated in FIG. 1 by way of example, and various elements of this figure are referenced in explaining exemplary method 200. Each block shown in FIGS. 2A and 2B represents one or more processes, methods or subroutines, carried out in the exemplary method 200. The exemplary method 200 can begin at block 202.

At block 202, an invitation to an upcoming meeting hosted on an online conferencing system can be sent. For example, the online conference server 102 can send an invitation to each invitee of an upcoming meeting. The invitation can be an email message inviting the invitees to attend the upcoming meeting. The email can include a subject for the meeting, meeting location, meeting date, meeting time, other invitees, conference number, pin number, etc. The meeting time can include a start time and an end time. The email message can include meeting options for the invitee to select as a response. The options can include yes, maybe and no. After sending a meeting invitation, the method 200 can proceed to block 204.

At block 204, a request, by an invitee of the upcoming meeting, to access the upcoming meeting prior to the meeting time can be received. For example, the online conference server 102 can receive a request to access the meeting, by an invitee, prior to the meeting time. By accessing the meeting prior to the meeting time, the invitee can record a presentation for the upcoming meeting. In some embodiments, a preselected threshold can be used to determine if an invitee can record a presentation. For example, if an invitee accesses the meeting one hour prior to the meeting, the invitee can record a presentation. However, if the invitee accesses the meeting a half hour early, the invitee cannot record a presentation. After receiving a request to access the meeting prior to the meeting, the method 200 can proceed to block 206.

At block 206, the invitee can be prompted to record a presentation for the upcoming meeting. For example, the online conference server 102 can prompt the invitee to record a presentation via a graphical user interface. The graphical user interface can include a menu option or a button which when selected allows the invitee to record a presentation. After prompting the invitee to record a presentation, the method 200 can proceed to block 208.

At block 208, a presentation can be recorded. For example, the online conference server 102 can record a presentation by the invitee. Examples of the recorded presentation can be a PowerPoint presentation along with audio or a Word document in which the invitee discusses the document. Using a graphical user interface, the invitee can record and edit the presentation. After recording the presentation, the method 200 can proceed to block 210.

At block 210, the recorded presentation can be saved. For example, using the graphical user interface, the invitee can save the recorded presentation to the storage 104. After saving the recorded presentation, the saved recorded presentation can be referred to as the recorded presentation or the pre-recorded presentation. The invitee who recorded the presentation can be referred to as the presenter or virtual presenter. By saving the recorded presentation, the host or another member of the online conference can play the pre-recorded presentation during the online conference meeting. After saving the recorded presentation, the method 200 can proceed to block 212.

At block 212, the invitees can connect to the online conference meeting. For example, prior to the start time of the conference meeting, invitees can connect to the online conference server 102. The connections can include, but are not limited to, connecting over the Internet, invitees calling into the online conference, the online conference server 102 calling the invitees, connecting via an instant messaging system, or any combination thereof. In one or more embodiments, an invitee can access the online conference meeting and request to have the online conference server 102 call the invitee at a pre-selected phone number. In one or more embodiments, the invitee can call a pre-designated number. For example, the invitee can call an 800 number and enter a password to access the online conference. During the online conference, invitees can communicate with another invitee, a group of invitees and/or all the invitees using a chat function and/or text messaging. After the invitees are connected to the online conference, the method 200 can proceed to block 214.

At block 214, the online conference meeting can start. For example, the online conference server 102 can communicatively couple the invitees to the meeting. In some embodiments, once the host is communicatively coupled to the online conference server, all of the invitees can be communicatively coupled. In other embodiments, the invitees can be communicatively coupled at about the start time of the meeting. After starting the online conference meeting, the method 200 can continue to block 216.

Figure 3:
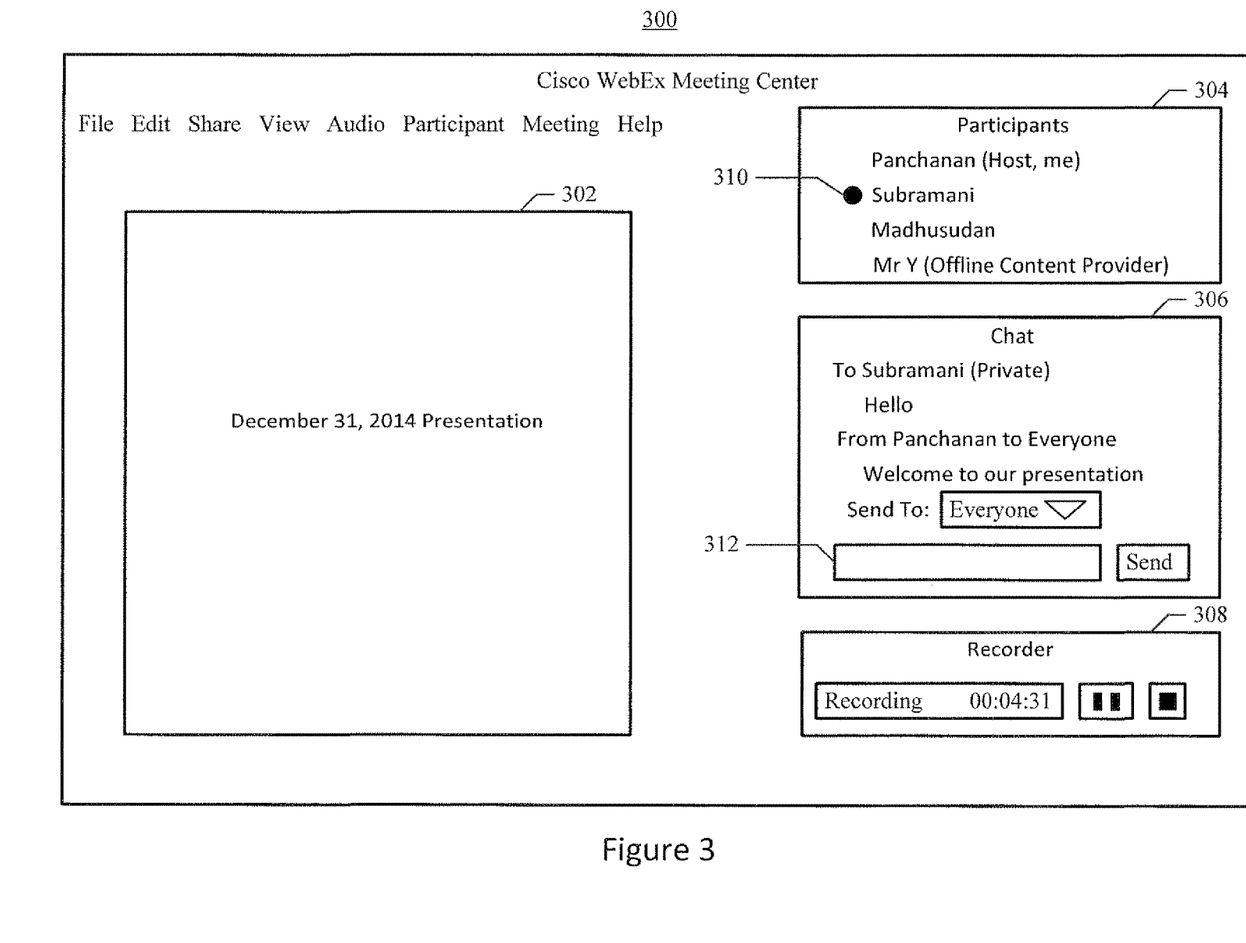
FIG. 3 is a block diagram of a first screenshot of an online conference meeting in accordance with an exemplary embodiment.
Figure 4:
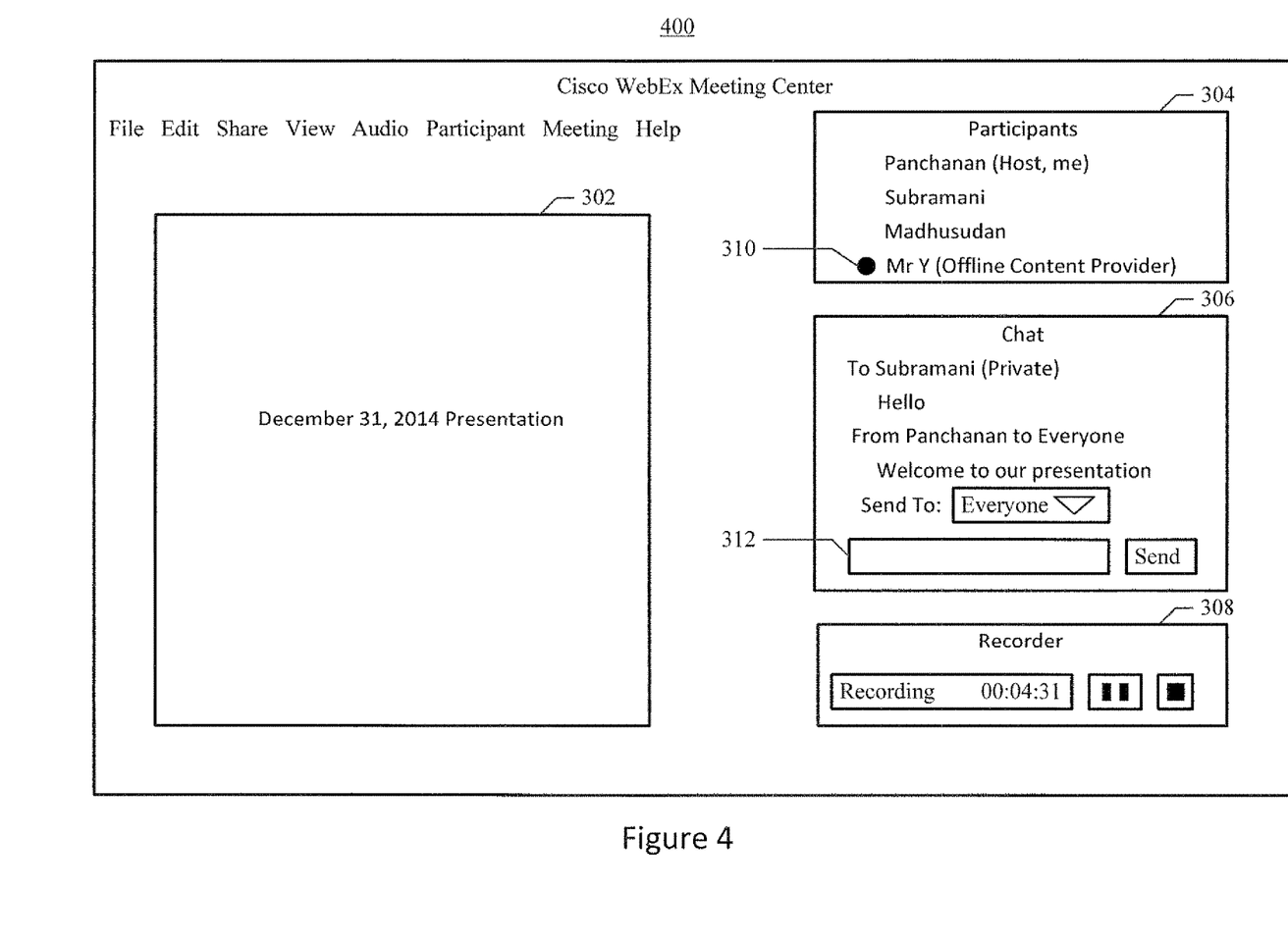
FIG. 4 is a block diagram of a second screenshot of an online conference meeting in accordance with an exemplary embodiment.

Referring to FIGS. 3 and 4, block diagrams of screenshots of an online conference meeting in accordance with an exemplary embodiment are illustrated. A network device 106 can display the illustrated screenshots 300, 400 provided by the online conference server 102. As shown, the screenshots 300, 400 can include a presentation area 302, a participant area 304, a chat area 306 and a recorder area 308. The presentation area 302 can display a pre-recorded presentation, presentation, document, web browser or other content that can be displayed on a display screen of a network device 106 coupled to the online conference meeting. The participant area 304 can include information associated with the online conference meeting participants. For example, a list of participants and information about the participants are shown. In this online conference meeting, Panchanan is the host and is participating via phone (not shown), Subramani and Mahusuclan are participating via computer (not shown) and Mr. Y is an offline content provider—a participant who pre-recorded a presentation. In FIG. 3, Subramani is speaking and has control of the meeting as shown by the ball 310 next to his name. In FIG. 4, Mr. Y has control of the meeting as shown by the ball 310 next to his name. By having control, Mr. Y pre-recorded presentation can be played. Control can have been passed to Mr. Y by Panchanan. For example, using the graphical user interface Panchanan could have made dragged the control ball to Mr. Y's name to pass control to him. In one or more embodiments, other known means can be used to pass control to the offline content provider.

The chat area 306 can display chat messages. The messages can be private or public (e.g., open to everyone). The chat area 306 can include a text box 312 which can be used by a participant to enter chat messages. The text box can be part of a chat function for the online conference system 100. The chat function can allow participants to enter chat messages and share them among one or more participants. The recorder area 308 can display recording information regarding the recording of the present online conference meeting. For example, as shown, the meeting is being recorded and is 4:31 in duration. The recorder area 310 can have buttons, such as a pause button and stop button, to control the recording. The buttons can include a record button (not shown) to start the recording of the online conference meeting. For example, in response to a record button being selected, the online conference server 102 can start to record the online conference meeting and in response to a stop button being selected, the online conference server 102 can stop the recording. The online conference server 102 can record one or more screens of one or more participants and/or the audio. For example, a presentation being displayed in the presentation area 302, e.g., a non-pre-recorded presentation, can be recorded. The recorded online conference meeting can be stored in the storage 104.

Figure 5:
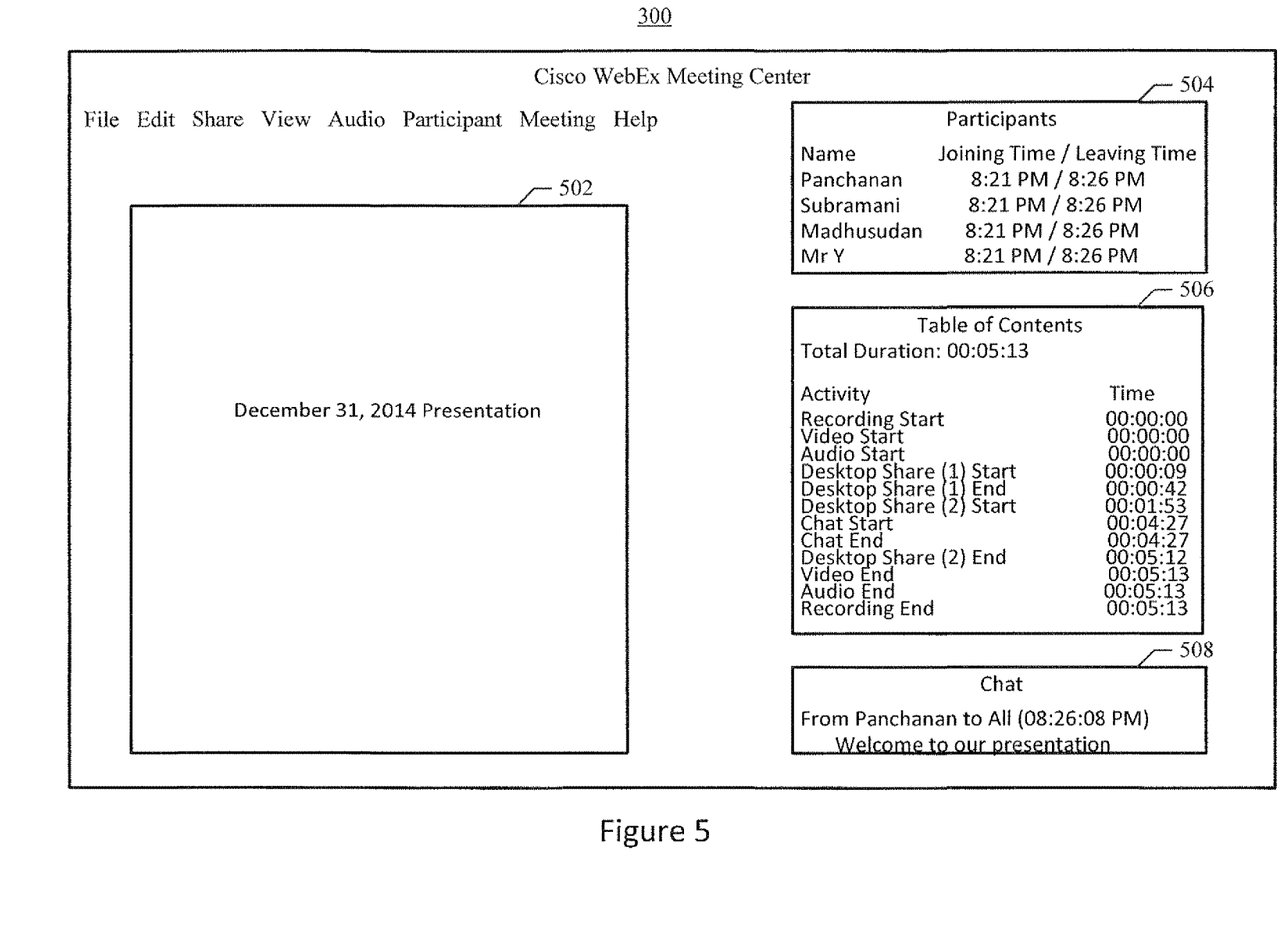
FIG. 5 is a block diagram of a screenshot of a recorded online conference meeting in accordance with an exemplary embodiment.

Referring to FIG. 5, a block diagram of a screenshot of a recorded online conference meeting in accordance with an exemplary embodiment is illustrated. As shown, the screenshot 500 of the recorded online conference meeting can have a presentation area 502, a participant area 504, a table of contents area 506 and a chat area 508. The presentation area 502 can display the presentations that were played during the online conference meeting and include a date stamp, e.g., "Dec. 31, 2014 Presentation," as illustrated by FIG. 5. The participant area 504 can list the participants along with each participant's joining time and leaving time. For example, as illustrated by FIG. 5, a first participant, i.e., "Panchanan," is indicated to have joined the online conference via a first timestamp, e.g., "8:21 PM." and to have left the online conference per a second timestamp, e.g., "8:26 PM." The table of contents area 506 can provide information about the recording and include multiple timestamps associated with the recording and events occurring during the recording. For example, the online conference lasted for 5:13. A first desktop was shared at the 0:09 mark and ended at the 1:53 mark. A second desktop was shared at the 1:53 mark and ended at the 4:27 mark. The chat area 508 shows that one message was shared with everyone at 8:26:08 PM.

During the meeting, the invitees or participants can ask questions via the audio aspect of the conference and/or can submit questions via a network device 106, such as using the chat area 306, text messaging and/or email. During the online conference, the online conference server 102 can record or collect questions by one or more invitees. For questions directed at invitees who are communicatively coupled to the online conference meeting, the questions can be provided to the invitee(s) via the chat area 306, text messaging and/or email during the conference. For questions for the presenter, the questions can be handled in various ways depending on the presenter's connection to the online conference meeting. For example, invitees can ask question of the presenter during online conference call, if the presenter is connected via a computer and/or a telephone. If the presenter cannot talk, for example, the presenter is at an airport and cannot answer questions due to noise and/or security issues, the presenter can receive and answer questions via the chat area 306 if connected to the online server 102. In one or more embodiments, questions can be provided to the presenter via text messaging and/or email. In another embodiment, if the presenter is not a participant of the online conference meeting or cannot answer the questions via the chat function, questions can be submitted to the online conference server 102 via the chat function, text messaging and/or email with the questions being collected and an email sent to the presenter at the conclusion of the meeting. If the presenter is not a participant of the online conference meeting, the presenter can be shown, via invitee's graphical user interfaces, as a virtual participant or offline content provider.

Returning to FIG. 2B, at block 216, the pre-recorded presentation can be played. For example, the host, the invitee who recorded the presentation or another invitee takes control of the meeting and can control the pre-recorded presentation. For example, using a graphical user interface, the host, presenter or another invitee can obtain the pre-recorded presentation from the storage 104 and control the recording by pausing, stopping, resuming, rewinding, fast forwarding, etc. After playing the recording, the method 200 can proceed to block 218.

At block 218, collected questions can be provided to the presenter. For example, at the conclusion of the meeting, the online conference server 102 can send the collected questions to the presenter via email. The presenter can answer the one or more questions. The answers can be provided to all the invitees or to the individual invitee who asked the question. The online conference server 102 can associate the questions and answers with the recorded conference.

For clarity of explanation, in some instances the present technology may be presented as including individual functional blocks including functional blocks comprising devices, device components, steps or routines in a method embodied in software, or combinations of hardware and software. In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

What is claimed:

1. A method for hosting an online meeting event, the method comprising:

sending, via a conference server, an invitation to an online meeting event having a meeting start time and a list of invited meeting participants;

processing, via the conference server, a request to access the online meeting event from a network computing device of a meeting participant prior to the meeting start time based on a preselected threshold to determine whether the meeting participant can record a presentation;

prompting, via the conference server, the meeting participant to record the presentation in response to the request meeting the preselected threshold, the prompting of the meeting participant to record the presentation does not occur in response to the request not meeting the preselected threshold;

receiving, at the conference server, the recorded presentation for the online meeting event prior to the meeting start time, by the meeting participant;

hosting, via the conference server, the online meeting event by:
  connecting one or more invited meeting participants to the conference server as online meeting participants via a connection between each of the one or more invited meeting participants and the conference server, the connecting occurring via the conference server initiating an opening of the connection to the one or more invited meeting participants;
  showing the meeting participant as a virtual presenter; and
  playing the recorded presentation in response to receiving another request for the virtual presenter to participate in the online meeting;

recording the online meeting event, the online meeting event including at least the recorded presentation and one or more interactions between the online meeting participants; and saving the recording of the online meeting event, the recorded presentation associated with a timestamp, the one or more interactions between the online meeting participants associated with one or more other timestamps.

2. The method of claim 1 wherein hosting the online meeting event comprises:
  providing a chat function and receiving one or more questions for the virtual presenter; and
  forwarding the one or more questions for the virtual presenter to the meeting participant.

3. The method of claim 2, further comprising:
  receiving, from the meeting participant, one or more answers to the one or more questions; and
  forwarding the one or more answers to the invited meeting participants.

4. The method of claim 3 wherein the one or more answers are forwarded to the invited meeting participants via the chat function of the online meeting event.

5. The method of claim 1, wherein the recorded presentation further comprises one or more presentation documents, the one or more presentation documents containing content related to voice data of the meeting participant.

6. An online meeting system comprising:
a conference server;
a non-transitory computer-readable storage medium having stored therein instructions which, when executed by a processor of the conference server, cause the processor to:
  send an invitation to an online meeting event having a meeting start time and a list of invited meeting participants;
  process a request transmitted from a network computing device of a meeting participant to access the online meeting event prior to the meeting start time based on a preselected threshold to determine whether the meeting participant can record a presentation;
  prompt the meeting participant to record the presentation in response to the request meeting the preselected threshold, the prompt of the meeting participant to record the presentation does not occur in response to the request not meeting the preselected threshold;
  receive the recorded presentation for the online meeting event prior to the meeting start time, by the meeting participant;
  host the online meeting event, wherein hosting the online meeting event comprises instructions to cause the processor to:
    connect one or more invited meeting participants to the conference server as online meeting participants via a connection between each of the one or more invited meeting participants and the conference server, the connection occurring via the conference server initiating an opening of the connection to the one or more invited meeting participants;
    show the meeting participant as a virtual presenter; and
    play the recorded presentation in response to receiving another request for the virtual presenter to participate in the online meeting;
  record the online meeting event, the online meeting event including at least the recorded presentation and one or more interactions between the online meeting participants; and
  save a recording of the online meeting event, the recorded presentation associated with a timestamp, the one or more interactions between the online meeting participants associated with one or more other timestamps.

7. The system of claim 6 wherein hosting the online meeting event comprises instructions to cause the processor to:
  provide a chat function and receive one or more questions for the virtual presenter; and
  forward the one or more questions for the virtual presenter to the meeting participant.

8. The system of claim 7, wherein hosting the online meeting event further comprises instructions to cause the processor to:
  receive, from the meeting participant, one or more answers to the one or more questions; and
  forward the one or more answers to the invited meeting participants.

9. The system of claim 8 wherein the one or more answers are forwarded to the invited meeting participants via the chat function of the online meeting event.

10. The system of claim 6 wherein the recorded presentation further comprises one or more presentation documents, the one or more presentation documents containing content related to a voice data of the meeting participant.

11. At least one non-transitory computer readable medium comprising instructions stored thereon, the instructions, when executed by a processor of a conference server, effective to cause a computing system to:
  send an invitation to an online meeting event having a meeting start time and a list of invited meeting participants;

processing a request transmitted from a network computing device of a meeting participant to access the online meeting event prior to the meeting start time based on a preselected threshold to determine whether the meeting participant can record a presentation such that, in response to the request not meeting the preselected threshold, then the meeting participant cannot record the presentation;

prompt the meeting participant to record the presentation in response to the request meeting the preselected threshold, the prompting of the meeting participant to record the presentation does not occur in response to the request not meeting the preselected threshold;

receive the recorded presentation for the online meeting event prior to the meeting start time, by the meeting participant;

host the online meeting event, wherein hosting the online meeting event comprises instructions to cause the computing system to:

connect one or more invited meeting participants to the conference server as online meeting participants via a connection between each of the one or more invited meeting participants and the conference server, the connection occurring via the conference server initiating an opening of the connection to the one or more invited meeting participants;

show the meeting participant as a virtual presenter; and play the recorded presentation in response to receiving a request for the virtual presenter to participate in the online meeting;

record the online meeting event, the online meeting event including at least the recorded presentation and one or more interactions between the online meeting participants; and save a recording of the online meeting event, the recorded presentation associated with a timestamp, the one or more interactions between the online meeting participants associated with one or more other timestamps.

12. The non-transitory computer readable medium of claim 11, wherein the instructions cause the computing system to:

provide a chat function and receive one or more questions for the virtual presenter; and forward the one or more questions for the virtual presenter to the meeting participant.

13. The non-transitory computer readable medium of claim 12, wherein hosting the online meeting event further comprises instructions to cause the computing system to:

receive, from the meeting participant, one or more answers to the one or more questions; and forward the one or more answers to the invited meeting participants.

14. The non-transitory computer readable medium of claim 13 wherein the instructions cause the computing system to forward the one or more answers to the invited meeting participants via the chat function of the online meeting event.

15. The non-transitory computer readable medium of claim 11 wherein the recorded presentation further comprises one or more presentation documents, the one or more presentation documents containing content related to a voice data of the meeting participant.

* * * * *